US008501297B2

(12) United States Patent
Meier

(10) Patent No.: US 8,501,297 B2
(45) Date of Patent: Aug. 6, 2013

(54) HONEYCOMB STRUCTURE

(75) Inventor: Reinhold Meier, Dorfen (DE)

(73) Assignee: MTU Aero Engines AG, Munich (DE)

( * ) Notice: Subject to any disclaimer, the term of this patent is extended or adjusted under 35 U.S.C. 154(b) by 583 days.

(21) Appl. No.: 12/667,857

(22) PCT Filed: Jun. 21, 2008

(86) PCT No.: PCT/DE2008/001041
§ 371 (c)(1), (2), (4) Date: Jun. 1, 2010

(87) PCT Pub. No.: WO2009/003445
PCT Pub. Date: Jan. 8, 2009

(65) Prior Publication Data

US 2010/0283211 A1 Nov. 11, 2010

(30) Foreign Application Priority Data

Jul. 5, 2007 (DE) ......................... 10 2007 031 404

(51) Int. Cl.
*B32B 3/12* (2006.01)
*F01D 11/12* (2006.01)
*F16J 15/44* (2006.01)

(52) U.S. Cl.
USPC .................... 428/116; 416/241 B; 416/241 R

(58) Field of Classification Search
USPC .................. 428/116–118; 416/241 B, 241 R
See application file for complete search history.

(56) References Cited

U.S. PATENT DOCUMENTS 3,529,905 A * 9/1970 Meginnis ...................... 415/176
2005/0266207 A1* 12/2005 Ohara ........................... 428/116

FOREIGN PATENT DOCUMENTS

EP 0 957 237 A 11/1999
WO 2006/076881 A 7/2006

OTHER PUBLICATIONS

PCT/DE2008/001041, International Search Report.

* cited by examiner

*Primary Examiner* — Jennifer McNeil
*Assistant Examiner* — Xiaobei Wang
(74) *Attorney, Agent, or Firm* — Howison & Arnott, L.L.P.

(57) ABSTRACT

Disclosed is a honeycomb structure for non-hermetic rotor-stator and rotor-rotor seals in turbo machines. Said honeycomb structure comprises a plurality of at least predominantly radially oriented honeycomb cells which are separated by cell walls, are open on one side, cooperate with at least one sharp sealing edge that rotates relative to the honeycomb structure, and can yield relative to the sharp sealing edge by being deformed and/or material being removed therefrom when being touched. The walls of the honeycomb cells have holes according to a defined perforation pattern.

10 Claims, 1 Drawing Sheet

HONEYCOMB STRUCTURE

CROSS-REFERENCE TO RELATED APPLICATIONS

This application is a U.S. National Phase application submitted under 35 U.S.C. §371 of Patent Cooperation Treaty application serial no. PCT/DE2008/001041, filed 21 Jun. 2008, and entitled HONEYCOMB STRUCTURE, which application claims priority to German patent application serial no. 10 2007 031 404.5, filed 5 Jul. 2007, and entitled WABENSTRUKTUR, the specifications of which are incorporated herein by reference in their entireties.

TECHNICAL FIELD

The invention relates to a honeycomb structure for nonhermetic rotor-stator and rotor-rotor seals in turbine machines. In particular, a honeycomb structure with a plurality of at least predominantly radially oriented honeycomb cells which are separated by cell walls, are open on one side, and cooperate by their free edges with at least one sharp sealing edge that rotates relative to the honeycomb structure.

BACKGROUND

Such honeycomb structures are generally designed with hexagonal honeycomb cells in cross section. The sharp sealing edges that cooperate with them are also known as sealing fins. It is required of the honeycomb structure that it be able to yield upon making contact with a sharp sealing edge by deformation and/or material ablation and in no way damage the sharp sealing edge. Usually, sufficiently temperature-resistant as well as oxidation and corrosion-resistant metal is used as the material for the cell walls of the honeycomb cells, preferably one based on nickel. In order to provide a sufficient yielding given the relatively high strength and hardness of this material, the wall thicknesses of the cell walls must be chosen to be extremely thin. This primarily limits the manufacturing possibilities for the honeycomb structure. As a rule, preshaped metal sheets are the starting product, being joined together and applied to a substrate by soldering. The honeycomb structure so formed must then be lathe-turned or ground to measure, which in turn can lead to problems due to the slight wall thicknesses. Besides cell deformations, sharp burr can result, which can only be removed at great expense. The lifetime of the thin cell walls is limited by oxidation and corrosion attack, among other things. Erosion is also a problem in this connection. Finally, cracks, holes and other types of damage can result.

It is also known how to improve the yielding capacity of a honeycomb structure by inclining the honeycomb cells in the rotational, or circumferential direction, rather than the radial direction. But this has consequences for the flow engineering and drawbacks in the fabrication technology.

SUMMARY

Accordingly, the problem of the disclosure is to propose a honeycomb structure for nonhermetic rotor-stator and rotor-rotor seals in turbine machines that has a longer lifetime and offers more fabrication possibilities with comparable yielding behavior.

This problem is solved by an apparatus with features as described and claimed herein and a process with features as described and claimed herein. According to the disclosure, the cell walls of the honeycomb cells are provided with holes according to a defined perforation pattern. In this way, the cell walls of the honeycomb cells can be made thicker, more durable, more precise, and easier to fabricate. This enables or facilitates the application of new, more economical, integral fabrication methods, such as the MIM (metal injection molding) method. Thus, the yielding capacity of the honeycomb structure is basically determined by the perforation pattern and the hole geometry. In this way, bending sites or predetermined breaking sites can be arranged in specific locations. The added expense of making the holes is offset by a more economical method of production of the honeycomb structure itself.

Preferred embodiments of the honeycomb structure described in the claims are characterized in the subclaims.

BRIEF DESCRIPTION OF THE DRAWINGS

The invention will now be explained in further detail by means of the drawings. There are shown, in simplified, not dimensional representation.

DETAILED DESCRIPTION

Figure 1:
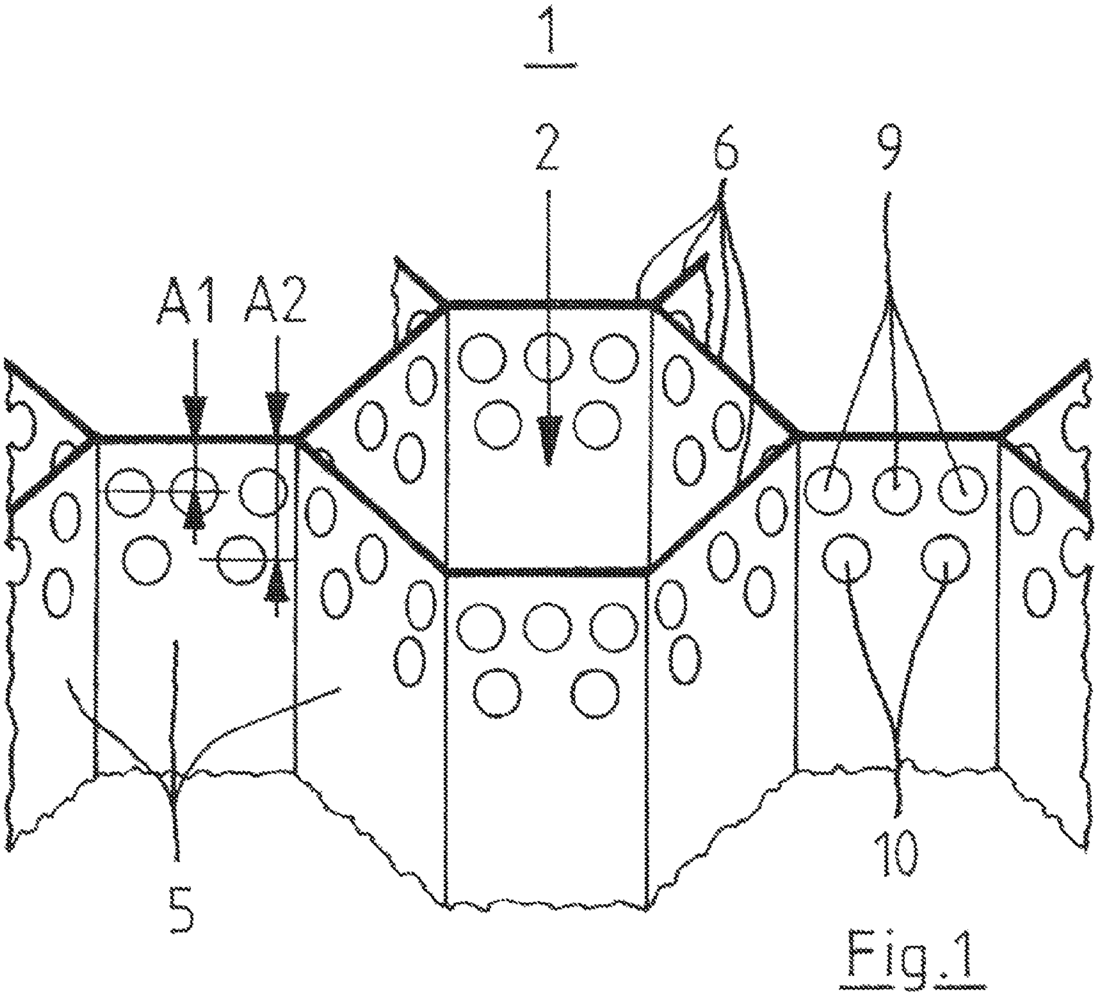
FIG. 1, a perspective view of a perforated honeycomb structure with hexagonal honeycomb cells, FIG. 2, a top view of a hexagonal honeycomb cell in sheet metal construction, and FIG. 3, a top view of a square honeycomb cell in sheet metal construction.

The integral honeycomb structure 1 according to FIG. 1 is especially suitable for a powder metallurgy production in so-called MIM construction. The naturally even cell walls 5 of the honeycomb cells 2 form hexagonal structures in the shape of a honeycomb. At their free edges 6, the cell walls 5 of the honeycomb cells 2 are provided with a defined perforation pattern. The perforation pattern comprises holes 9 which are arranged close to the free edges 6 of the cell walls 5, as well as holes 10 which are arranged at a greater distance from the free edges 6. The constant distances of the centers of the holes from the free edges 6 for the holes 9 and for the holes 10 are designated by A1 and A2. In the example depicted, the holes 9 and the holes 10 are round and have the same diameter, although the number of holes 10 is less than that of holes 9. This is achieved by a different hole separation. De facto, the perforation pattern shown has the effect that the cell walls 5 become more yielding at the free edges 6. It is clear to the person versed in the art that he has a large number of variation possibilities in the context of the invention. Thus, instead of round holes he can use elliptical or oval holes. Of course, he can also combine different sizes and shapes of holes. He can also deliberately increase or decrease the density of holes in certain places. It will be advisable to provide holes only where a rubbing or wearing in of the sharp sealing edges is expected in normal operation. Various fabrication methods lend themselves to producing the holes in the cell walls 5, such as mechanical boring or mechanical punching, electron beam or laser boring, electrochemical boring or spark erosion boring. For the mentioned MIM construction, the holes can be introduced before and/or after the sintering of the structure. In the likewise possible sheet metal construction it may be advisable to punch the holes out from the metal sheets before they are joined into the honeycomb structure. In any case, the goal will be to achieve the desired fabrication accuracy in an economical way.

Figure 2:
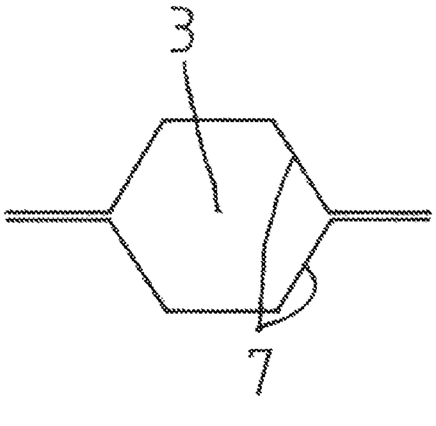

FIG. 2 shows how to create hexagonal honeycomb cells 3 with preshaped metal sheets. The effect which occurs here is that one part of the cell walls is in a single layer, the other part in a double layer. The invention affords the possibility here of using a different perforation pattern for the double-layer cell walls than for the single-layer cell walls. Ultimately, a comparable yielding behavior should be achieved for all wall types.

Figure 3:
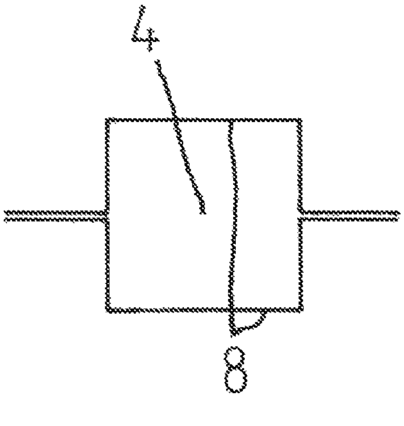

As an alternative to FIG. 2, FIG. 3 shows the production of honeycomb cells 4 with square cross section. In this case, metal sheets 8 bend at right angles in a crenellated fashion are joined together. With square or rectangular honeycomb cells 4 it can be advisable to provide only the cell walls standing transversely to the sharp sealing edges or their direction of movement with a perforation pattern.

All of this is easily understandable to the person versed in the art and therefore is not shown separately.

The invention claimed is:

1. A honeycomb structure for nonhermetic seals in turbine machines having a sealing edge that rotates relative to the honeycomb structure on an axis of rotation, the honeycomb structure comprising:

a plurality of at least predominantly radially oriented honeycomb cells defined by separating cell walls and open on one side;

cell walls cooperating by their free edges with the sealing edge, the cell walls yielding relative to the sealing edge by being deformed and/or by ablation of material when contact is made; and wherein the cell walls of the honeycomb cells are provided with holes according to a defined perforation pattern and wherein the defined pattern comprises several radially staggered rows of holes, the holes of each row having a defined, at least substantially constant radial spacing from the respective free edges of the cell walls and wherein the number of holes within a row decreases from one row to another with increasing radial distance from the free edges of the cell wall.

2. A honeycomb structure in accordance with claim 1, wherein the cell walls of the honeycomb cells are provided with holes only in a region in which a running in of the sealing edge is anticipated in consideration of the relative movements possible in normal operation.

3. A honeycomb structure in accordance with claim 1, wherein the holes in the cell walls are produced with round, oval or elliptical cross section.

4. A honeycomb structure in accordance with claim 3, wherein the holes in the cell walls are produced mechanically, by means of high-energy beam, spark erosion, or electrochemically.

5. A honeycomb structure in accordance with claim 1, wherein the honeycomb cells have a rectangular or hexagonal cross section, wherein every two neighboring honeycomb cells possess one cell wall in common and/or two adjoining cell walls.

6. A honeycomb structure in accordance with claim 5, wherein the structure is produced by joining techniques in welding and/or soldering, making use of metal sheets bent at an angle, or integrally in the MIM (metal injection molding) technique.

7. A cellular seal structure for rotating seals in turbine machines having an axis of rotation and a sealing edge that rotates relative to the seal structure, the cellular seal structure comprising:

a plurality of substantially radially oriented cells defined by cell walls, the cell walls having free edges disposed adjacent to the sealing edge that rotates relative to the seal structure, the cells being open on the side adjacent to the free edges;

the cell walls yielding to the sealing edge when contact is made therebetween; and the cell walls having a plurality of holes formed therein according to a defined perforation pattern wherein the holes in the cell wall are arranged in a plurality of rows, each row being spaced a different radial distance from the free edges of the cell wall with respect to the axis of rotation of the turbine machine and wherein the number of holes within a row decreases from one row to another with increasing radial distance from the free edges of the cell wall.

8. A cellular seal structure in accordance with claim 7, wherein the cell walls of the plurality of cells are provided with holes only in a region in which a running in of the sealing edge is anticipated in consideration of the relative movements possible in normal operation.

9. A cellular seal structure in accordance with claim 7, wherein the holes in the cell walls are arranged in at least one row, and wherein the holes of each row have a substantially constant radial spacing with respect to the axis of rotation of the turbine machine from the respective free edges of the cell walls.

10. A cellular seal structure in accordance with claim 7, wherein the perforation pattern causes the cell walls to be more yielding at the free edges.

* * * * *